US012784623B2

(12) United States Patent
Hong

(10) Patent No.: US 12,784,623 B2
(45) Date of Patent: Nov. 3, 2026

(54) DISPLAY DEVICE

(71) Applicant: LG Display Co., Ltd., Seoul (KR)

(72) Inventor: Mookyoung Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/975,452

(22) Filed: Dec. 10, 2024

(65) Prior Publication Data

US 2025/0273102 A1 Aug. 28, 2025

(30) Foreign Application Priority Data

Feb. 26, 2024 (KR) ........................ 10-2024-0027085

(51) Int. Cl.
*G09G 3/00* (2006.01)
*G09G 3/3233* (2016.01)

(52) U.S. Cl.
CPC ........... *G09G 3/006* (2013.01); *G09G 3/3233* (2013.01); *G09G 2300/0842* (2013.01); *G09G 2320/043* (2013.01); *G09G 2330/021* (2013.01); *G09G 2330/12* (2013.01)

(58) Field of Classification Search
CPC ............... G09G 2330/12; G09G 3/006; G09G 2320/043; G09G 2330/021; G09G 2300/0842; G09G 3/3233
See application file for complete search history.

(56) References Cited

U.S. PATENT DOCUMENTS

2022/0208108 A1* 6/2022 Lee ...................... G09G 3/3266

FOREIGN PATENT DOCUMENTS

EP 0408425 * 2/1996 ......... G01R 31/2846
TW 1817890 * 10/2021 ........... G09G 3/3406

* cited by examiner

*Primary Examiner* — Scott D Au
(74) *Attorney, Agent, or Firm* — Seed Intellectual Property Law Group LLP

(57) ABSTRACT

Embodiments relate to a display device including a control printed circuit board on which a power management integrated circuit configured to generate and output a driving voltage is mounted, first and second connection cables connected to the control printed circuit board through a first connector, first and second source printed circuit boards connected to the first and second connection cables, respectively, through a second connector, circuit films on which a source driver integrated circuit is mounted and which are connected to the first and second source printed circuit boards, and a display panel which is connected to the circuit films and on which sub-pixels receiving the driving voltage from the power management integrated circuit through the first or second connection cable are disposed, and a method of driving the same.

20 Claims, 9 Drawing Sheets

DISPLAY DEVICE

CROSS-REFERENCE TO RELATED APPLICATION

The present application claims priority to Korean Patent Application No. 10-2024-0027085, filed Feb. 26, 2024, the entire contents of which is incorporated herein for all purposes by this reference.

BACKGROUND

Technical Field

The present disclosure relates to a display apparatus.

Description of the Related Art

As the information society develops, various demands for display devices for displaying images are increasing, and various types of display devices such as liquid crystal display (LCD) devices and organic light emitting diode (OLED) display devices are utilized.

Such a display device may include a display panel, a control printed circuit board on which components for driving the display panel are disposed, and a plurality of connection cables connecting the above components. The control printed circuit board may apply a driving voltage and the like to the display panel through the connection cables.

The connection cables may be connected to the display panel and the control printed circuit board in a connector connection manner. In this case, when the connection failure of the connector occurs in at least some of the connection cables, due to the connection failure of the connector, a concentration phenomenon of a current concentrated on other connection cables and/or wirings on the display panel may occur. In particular, in display devices that use high current driving voltages, the concentration phenomenon can cause heating and element degradation of the display panel.

BRIEF SUMMARY

Embodiments are directed to providing a display device capable of detecting connection failure of connection cables.

A display device according to an embodiment may include a control printed circuit board on which a power management integrated circuit configured to generate and output a driving voltage is mounted, first and second connection cables connected to the control printed circuit board through a first connector, first and second source printed circuit boards connected to the first and second connection cables, respectively, through a second connector, circuit films on which a source driver integrated circuit is mounted and which are connected to the first and second source printed circuit boards, and a display panel which is connected to the circuit films and on which sub-pixels receiving the driving voltage from the power management integrated circuit through the first or second connection cable are disposed.

The control printed circuit board may further include a controller configured to acquire first sensing data from sub-pixels connected to the first connector, acquire second sensing data from sub-pixels connected to the second connector, and determine connection failure of the first connector and the second connector based on a difference between the first sensing data and the second sensing data.

The controller may output a failure detection signal when the difference between the first sensing data and the second sensing data is greater than a second reference value.

The controller may determine an average current luminance based on the sensing data sensed from the sub-pixels and when the average current luminance is greater than a first reference value, further determine the connection failure of the first connector and the second connector.

The power management integrated circuit may be configured to output the driving voltage and the sensing voltage, and the controller may control the power management integrated circuit to output the sensing voltage and determine the connection failure based on the first and second sensing data acquired in response to the sensing voltage.

The controller may control the power management integrated circuit to output the driving voltage, determine an average current luminance based on the sensing data acquired in response to the driving voltage, control the power management integrated circuit to output the sensing voltage when the average current luminance is greater than a first reference value, and determine the connection failure based on the first and second sensing data acquired in response to the sensing voltage.

The sensing voltage may be a voltage obtained by dividing the driving voltage using a predetermined resistance component.

The control printed circuit board may further include a sensing unit configured to sense a current value flowing through the sub-pixels, convert the sensed current value into sensing data, and transmit the sensing data to the controller.

Each of the sub-pixels may include a light emitting element, a driving transistor connected to the driving voltage and the light emitting element to control the magnitude of a driving current flowing to the light emitting element according to a voltage applied to a gate node, a first transistor turned on by a gate signal to apply a data voltage applied to a data line to the gate node of the driving transistor, and a second transistor turned on by a sensing signal to output a current reflecting a characteristic value of the sub-pixel to a sensing line.

The sensing unit may sense a current value output to the sensing line.

The source driver integrated circuit may include a plurality of sensing channels configured to receive the driving voltage from the power management integrated circuit and connected to the sensing line through a switching element, and one or more dummy channels configured to receive the sensing voltage from the power management integrated circuit and connected to the sensing line through the switching element.

The one or more dummy channels may be disposed on edge areas at one side or both sides of the source driver integrated circuit.

A display device according to an embodiment may include a control printed circuit board on which a power management integrated circuit configured to generate and output a driving voltage is mounted, first and second circuit films on which a source driver integrated circuit is mounted and which are connected to the control printed circuit board through a first connector, and a display panel which is connected to the first or second circuit film through a second connector and on which sub-pixels receiving the driving voltage from the power management integrated circuit are disposed.

The control printed circuit board may further include a controller configured to acquire first sensing data from sub-pixels connected to the first connector, acquire second sensing data from sub-pixels connected to the second connector, and determine connection failure of the first connector and the second connector based on a difference between the first sensing data and the second sensing data.

The controller may output a failure detection signal when the difference between the first sensing data and the second sensing data is greater than a second reference value.

The controller may determine an average current luminance based on the sensing data sensed from the sub-pixels and when the average current luminance is greater than a first reference value, further determine the connection failure of the first connector and the second connector.

The power management integrated circuit may be configured to output the driving voltage and the sensing voltage, and the controller may control the power management integrated circuit to output the sensing voltage and determine the connection failure based on the first and second sensing data acquired in response to the sensing voltage.

The controller may control the power management integrated circuit to output the driving voltage, determine an average current luminance based on the sensing data acquired in response to the driving voltage, control the power management integrated circuit to output the sensing voltage when the average current luminance is greater than a first reference value, and determine the connection failure based on the first and second sensing data acquired in response to the sensing voltage.

The sensing voltage may be a voltage obtained by dividing the driving voltage using a predetermined resistance component.

A method of driving a display device according to an embodiment may include, by a controller, acquiring first sensing data from the sub-pixels connected to the first connector and acquiring second sensing data from the sub-pixels connected to the second connector, determining whether the difference between the first sensing data and the second sensing data is greater than a second reference value, and outputting a failure detection signal when the difference between the first sensing data and the second sensing data is greater than the second reference value.

The acquiring of the first sensing data and the second sensing data may include acquiring the sensing data from the sub-pixels, determining an average current luminance based on the sensing data, and determining whether the average current luminance is greater than a first reference value, and when the average current luminance is greater than the first reference value, the first sensing data and the second sensing data may be acquired.

The power management integrated circuit may be configured to output the driving voltage and the sensing voltage, the acquiring of the sensing data from the sub-pixels may include controlling the power management integrated circuit to output the sensing voltage, and the acquiring of the first sensing data and the second sensing data may include controlling the power management integrated circuit to output the sensing voltage.

The sensing voltage may be a voltage obtained by dividing the driving voltage using a predetermined resistance component.

DETAILED DESCRIPTION

Figure 1:
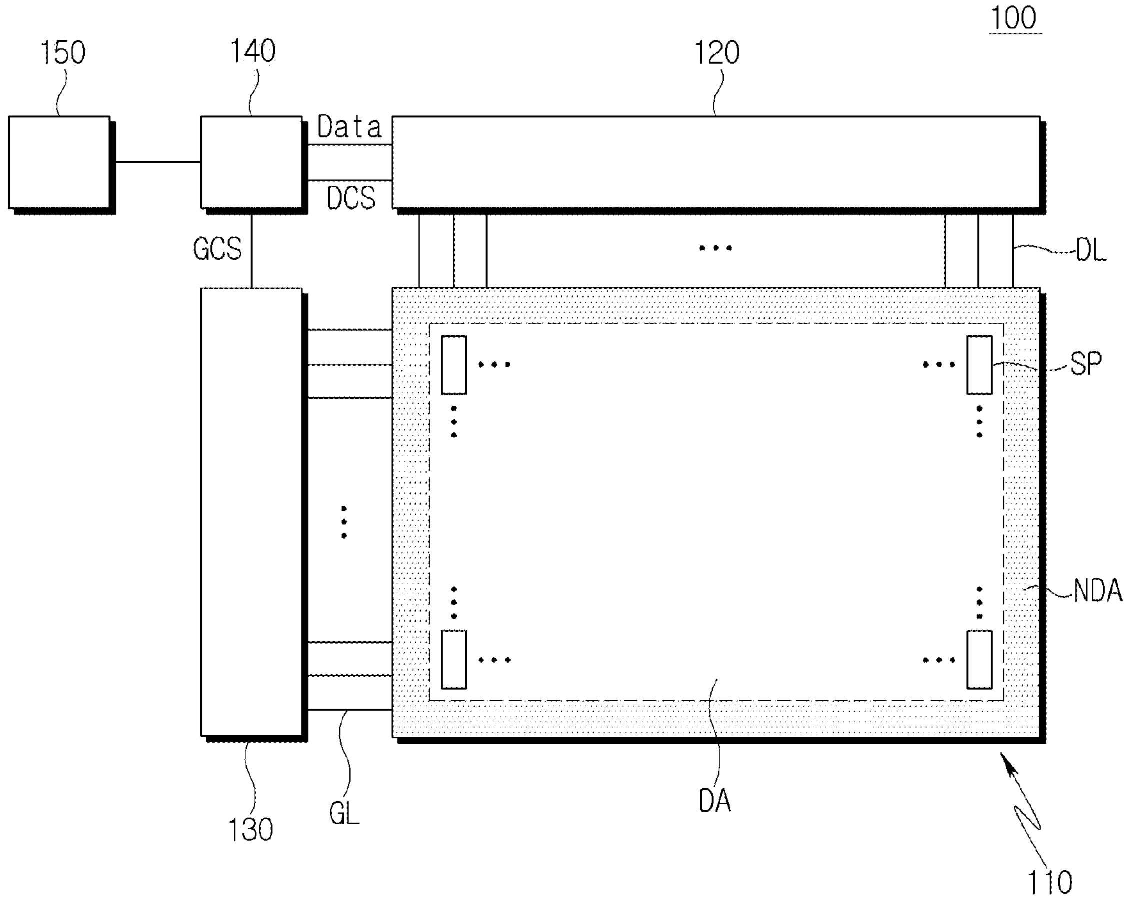
FIG. 1 is a block diagram showing a configuration of a display device according to an embodiment.

Hereinafter, embodiments will be described with reference to the accompanying drawings. In the specification, when a first component (or an area, a layer, a portion, or the like) is described as "on," "connected," or "coupled to" a second component, it means that the first component may be directly connected/coupled to the second component or a third component may be disposed therebetween.

The same reference numerals indicate the same components. In addition, in the drawings, thicknesses, proportions, and dimensions of components are exaggerated for effective description of technical contents. The term "and/or" includes all one or more combinations that may be defined by the associated configurations.

Terms "first," "second," and the like may be used to describe various components, but the components are not limited by the terms. The terms are used only for the purpose of distinguishing one component from another. For example, a first component may be referred to as a second component, and similarly, the second component may also be referred to as the first component without departing from the scopes of an embodiments. The singular expression includes the plural expression unless the context clearly dictates otherwise.

Terms such as "under," "at a lower side," "above," and "at an upper side" are used to describe the relationship between the components illustrated in the drawings. The terms are relative concepts and are described with respect to directions marked in the drawings.

It should be understood that term such as "includes" or "has" is intended to specify the presence of features, numbers, steps, operations, components, parts, or a combination thereof described in the specification and does not preclude the presence or addition possibility of one or more other features, numbers, steps, operations, components, parts, or combinations thereof in advance.

FIG. 1 is a block diagram showing a configuration of a display device according to an embodiment.

Referring to FIG. 1, a display device 100 according to an embodiment may include a display panel 110 and driving circuits 120, 130, and 140 for driving the display panel 110.

The driving circuits may include a data driving circuit 120, a gate driving circuit 130, and the like and further include a controller 140 for controlling the data driving circuit 120 and the gate driving circuit 130.

The display panel 110 may include signal lines such as a plurality of data lines DL and a plurality of gate lines GL. The display panel 110 may include a plurality of sub-pixels SP connected to the plurality of data lines DL and the plurality of gate lines GL.

The display panel 110 may include a display area DA in which images are displayed and a non-display area NDA in which the images are not displayed. In the display panel 110, the plurality of sub-pixels SP for displaying the images may be disposed in the display area DA, and in the non-display area NDA, the driving circuits 120, 130, and 140 may be electrically connected thereto, or the driving circuits 120, 130, and 140 may be mounted therein, and pad parts to which integrated circuits, printed circuits, and the like are connected may be disposed therein.

The controller 140 receives various timing signals including a vertical synchronization signal, a horizontal synchronization signal, an input data enable signal, a clock signal, and the like together with the input image data from an external device (e.g., a host system 150). The controller 140 may start scanning according to the timing implemented in each frame, convert externally input image data into a data signal format used in the data driving circuit 120, and supply the converted image data to the data driving circuit 120.

In addition, the controller 140 may supply a data control signal DCS to the data driving circuit 120 to control the operation timing of the data driving circuit 120. The controller 140 may supply a gate control signal GCS for controlling the operation timing of the gate driving circuit 130 to the gate driving circuit 130.

For example, the controller 140 receives the timing signals, such as the vertical synchronization signal, the horizontal synchronization signal, the input data enable signal, and the clock signal, generates various control signals DCS and GCS, and outputs the generated signals to the data driving circuit 120 and the gate driving circuit 130 to control the data driving circuit 120 and the gate driving circuit 130.

For example, the controller 140 outputs various gate control signals including a gate start pulse, a gate shift clock, a gate output enable signal, and the like to control the gate driving circuit 130. In addition, the timing controller 140 outputs various data control signals including a source start pulse, a source sampling clock, a source output enable signal, and the like to control the data driving circuit 120.

The controller 140 may be a timing controller used in a typical display technology, a control device capable of further performing other control functions other than the timing controller, a control device different from the timing controller, or a circuit in the control device. The controller 140 may be implemented as various circuits or electronic components, such as an integrated circuit (IC), a field programmable gate array (FPGA), an application specific integrated circuit (ASIC), and a processor. The controller 140 may be implemented as a component separated from the data driving circuit 120 or implemented as an integrated circuit by being integrated with the data driving circuit 120.

The controller 140 may be mounted on a printed circuit board, a flexible printed circuit, etc., and electrically connected to the data driving circuit 120 and the gate driving circuit 130 through the printed circuit board, the flexible printed circuit, etc.

The controller 140 may transmit and receive signals to and from the data driving circuit 120 according to one or more predetermined interfaces. Here, for example, the interface may include a low voltage differential signaling (LVDS) interface, an EPI interface, a serial peripheral interface (SPI), etc.

The controller 140 may include a storage medium such as one or more registers.

The data driving circuit 120 is a circuit for driving the plurality of data lines DL and may supply data signals to the plurality of data lines DL. The data driving circuit 120 drives the plurality of data lines DL by receiving image data Data from the controller 140 and supplying data voltages to the plurality of data lines DL. Here, the data driving circuit 120 is also referred to as a source driving circuit. The data driving circuit 120 may include one or more source driver integrated circuits.

Each source driver integrated circuit may include a shift register, a latch circuit, a digital to analog converter, an output buffer, etc. Each source driver integrated circuit may further include an analog to digital converter in some cases.

For example, each source driver integrated circuit may be connected to the display panel 110 in a tape automated bonding (TAB) type, connected to a bonding pad of the display panel 110 in a chip on glass (COG) type or a chip on panel (GOP) type, or connected to the display panel 110 in a chip on film (COF) type.

The data driving circuit 120 may be connected to one side (upper side or lower side) of the display panel 110. The data driving circuit 120 may be connected to both sides (e.g., upper and lower sides) of the display panel 110 or connected to two or more side surfaces among four side surfaces of the display panel 110 according to a driving method, a panel design method, etc.

When a specific gate line GL is opened by the gate driving circuit 130, the data driving circuit 120 may convert the image data Data received from the controller 140 into analog data voltages and supply the analog data voltages to the plurality of data lines DL.

The gate driving circuit 130 is a circuit for driving the plurality of gate lines GL and may supply gate signals to the plurality of gate lines GL. The gate driving circuit 130 may output a gate signal having a turn-on level voltage or a gate signal having a turn-off level voltage according to the control of the controller 140. The gate driving circuit 130 may sequentially drive the plurality of gate lines GL by sequentially supplying the gate signal having the turn-on level voltage to the plurality of gate lines GL.

The gate driving circuit 130 may be connected to the display panel 110 using the TAB method, connected to the bonding pad of the display panel 110 using the COG or COP method, or connected to the display panel 110 using the COF method. Alternatively, the gate driving circuit 130 may be formed in the non-display area NDA of the display panel 110 in a gate in panel (GIP) type. The gate driving circuit 130 may be disposed on or connected to the display panel 110. In other words, the gate driving circuit 130 may be disposed in the non-display area NDA of the display panel 110 in the case of the GIP type. The gate driving circuit 130 may be connected to the display panel 110 in the case of the COG type, the COF type, etc.

The gate driving circuit 130 may be connected to one side (left side or right side) of the display panel 110. The gate driving circuit 130 may be connected to both sides (e.g., left and right sides) of the display panel 110 or connected to two or more side surfaces among four side surfaces of the display panel 110 according to a driving method, a panel design method, etc.

Figure 2:
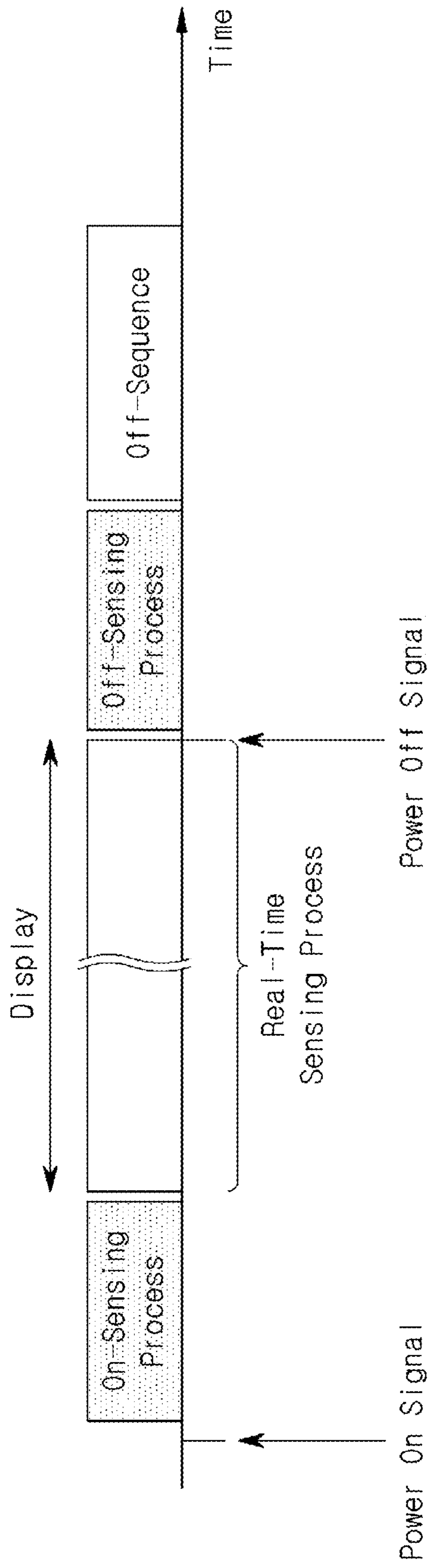
FIG. 2 is a diagram showing sensing timings according to an embodiment.

FIG. 2 is a diagram showing sensing timings according to an embodiment.

Referring to FIG. 2, when a power on signal is generated, the display device 100 according to an embodiment may sense a characteristic value of a driving transistor in each sub-pixel SP disposed on the display panel 110. Such a sensing process is referred to as "ON-sensing process."

In addition, when a power off signal is generated, the display device 100 may sense the characteristic value of the driving transistor in each sub-pixel SP disposed on the display panel 110 before an OFF-sequence, such as power cut-off, proceeds. Such a sensing process is referred to as "OFF-sensing process."

In addition, the display device 100 may sense the characteristic value of the driving transistor in each sub-pixel SP disposed on the display panel 110 every blank time during display driving until the power off signal is generated after the power on signal is generated. Such a sensing process is referred to as "real-time sensing process." Such a real-time sensing process may be performed every blank time between active times based on the vertical synchronization signal.

Figure 3:
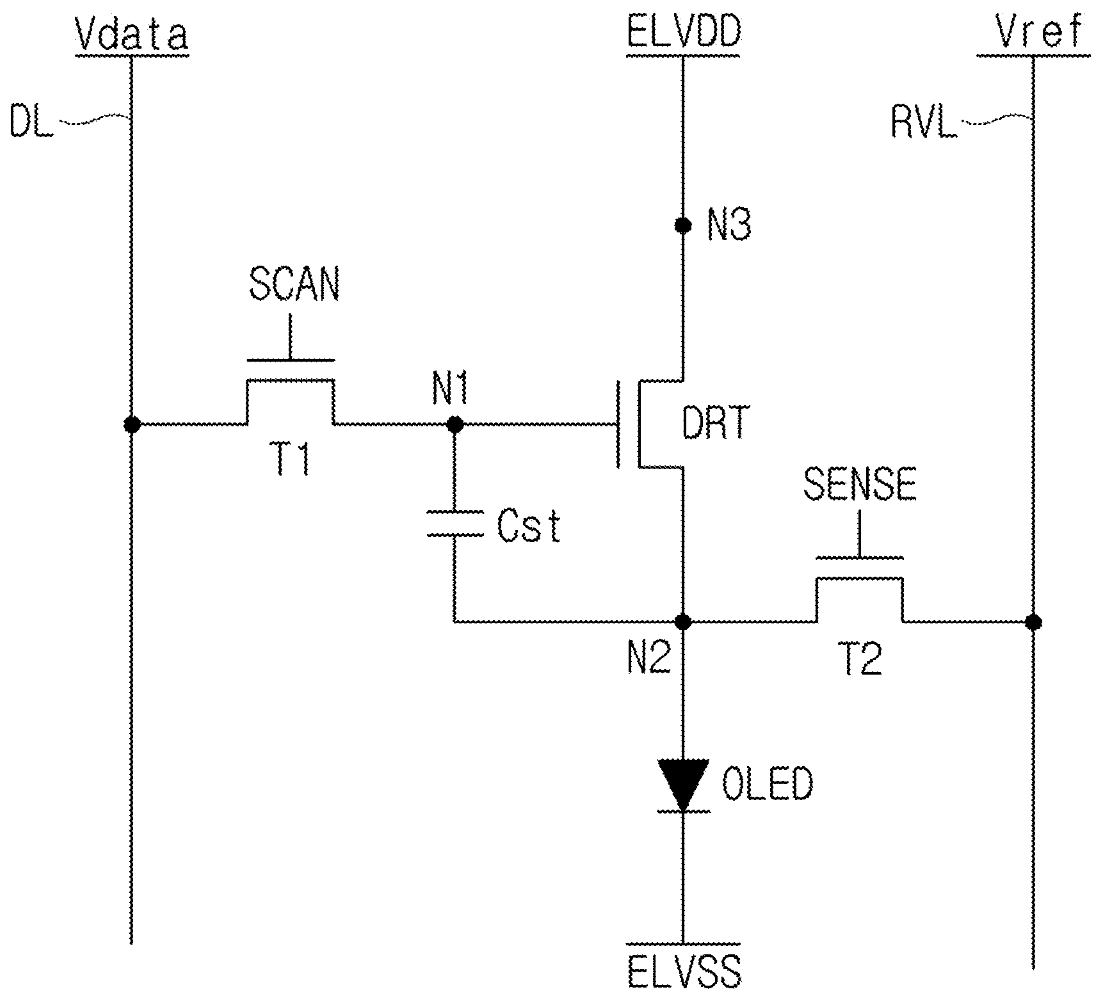
FIG. 3 is a circuit diagram according to an embodiment of a sub-pixel shown in FIG. 1.

FIG. 3 is a circuit diagram according to an embodiment of a sub-pixel shown in FIG. 1.

Referring to FIG. 3, the sub-pixel SP may include a light emitting element OLED, a driving transistor DRT for driving the light emitting element OLED, a first transistor T1 for transmitting a data voltage to a first node N1 corresponding to a gate node of the driving transistor DRT, and a storage capacitor Cst for maintaining a data voltage corresponding to an image signal voltage or a voltage corresponding to the data voltage for 1 frame.

The light emitting element OLED may include a first electrode (e.g., an anode or a cathode), an organic layer, a second electrode (e.g., a cathode or an anode), etc. A base voltage ELVSS may be applied to the second electrode of the light emitting element OLED.

The driving transistor DRT drives the light emitting element OLED by supplying a driving current to the light emitting element OLED. The driving transistor DRT has a first node N1, a second node N2, and a third node N3. The first node N1 of the driving transistor DRT is a gate node and may be electrically connected to a source node or a drain node of the first transistor T1. The second node N2 of the driving transistor DRT may be electrically connected to the first electrode of the light emitting element OLED and may be a source node or a drain node. The third node N3 of the driving transistor DRT is a node to which a driving voltage ELVDD is applied and may be a drain node or a source node.

The first transistor T1 may be electrically connected between the data line DL and the first node N1 of the driving transistor DRT to receive the gate signal SCAN at the gate node. The first transistor T1 may be turned on by the gate signal SCAN to transmit the data voltage Vdata supplied from the data line DL to the first node N1 of the driving transistor DRT.

The storage capacitor Cst may be electrically connected between the first node N1 and the second node N2 of the driving transistor DRT.

As a driving time of the sub-pixel SP increases, circuit elements, such as the light emitting element OLED and the driving transistor DRT, may be degraded. Therefore, unique characteristic values of the circuit elements, such as the light emitting element OLED and the driving transistor DRT, may be changed. Here, the characteristic value may include a threshold voltage of the light emitting element OLED, a threshold voltage of the driving transistor DRT, mobility of the driving transistor DRT, etc.

A change in characteristic values of the circuit elements may cause a change in luminance of the corresponding sub-pixel SP. In addition, the degree of change in characteristic values between the circuit elements may be changed depending on the degree of degradation of the sub-pixel SP. Differences in characteristic values may cause luminance deviation between sub-pixels.

To prevent such a problem, the sub-pixel SP according to an embodiment may include a compensation circuit for sensing the characteristic values of the sub-pixel SP and compensating changes in characteristic values.

Referring to FIG. 3, the sub-pixel SP may further include a second transistor T2. The second transistor T2 may be electrically connected between the second node N2 of the driving transistor DRT and a sensing line RVL through which a reference voltage Vref is supplied and controlled by receiving a sensing signal SENSE, which is a type of scan signal, at a gate node. The second transistor T2 is turned on by the sensing signal SENSE to apply the reference voltage Vref supplied through the sensing line RVL to the second node N2 of the driving transistor DRT. In addition, the second transistor T2 may be used as one of voltage sensing paths for the second node N2 of the driving transistor DRT. In other words, the second transistor T2 may be turned on by the sensing signal SENSE to output a current reflecting the characteristic value of the sub-pixel SP to the sensing line RVL.

In an embodiment, the gate signal SCAN and the sensing signal SENSE may be separate scan signals. In this case, the gate signal SCAN and the sensing signal SENSE may be applied to the gate node of the first transistor T1 and the gate node of the second transistor T2, respectively, through different gate lines.

In another embodiment, the gate signal SCAN and the sensing signal SENSE may be the same scan signal. In this case, the gate signal SCAN and the sensing signal SENSE may be applied to the gate node of the first transistor T1 and the gate node of the second transistor T2, respectively, through the same gate line.

Figure 4:
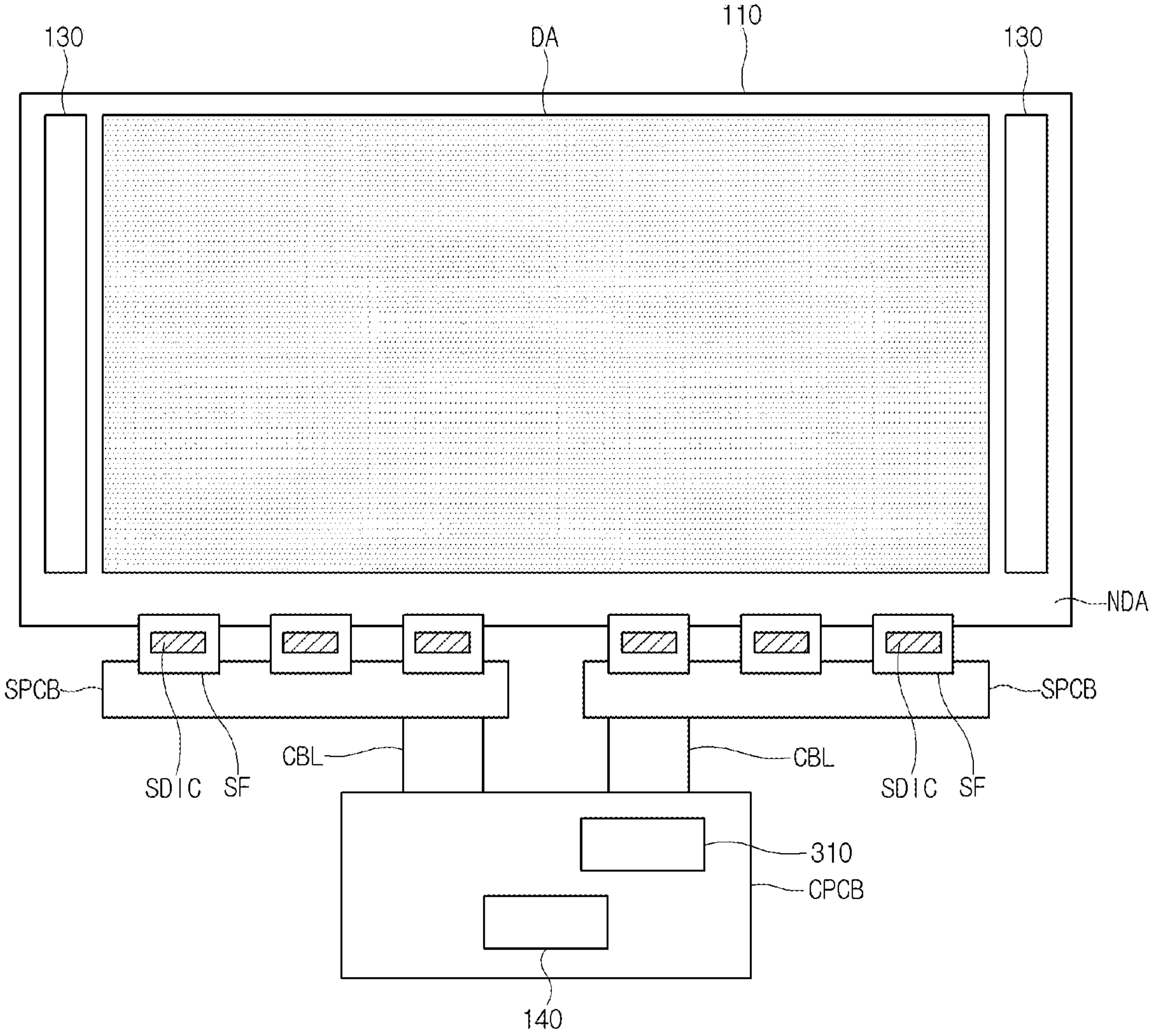
FIG. 4 is a view showing the display device according to an embodiment.

FIG. 4 is a view showing the display device according to an embodiment.

Referring to FIG. 4, the display panel 110 may include the display area DA in which images are displayed and the non-display area NDA in which the images are not displayed.

When the data driving circuit 120 includes one or more source driver integrated circuits SDIC and is implemented in the COF type, each source driver integrated circuit SDIC may be mounted on the circuit film SF connected to the non-display area NDA of the display panel 110.

The gate driving circuit 130 may be implemented in the GIP type. In this case, the gate driving circuit 130 may be formed in the non-display area NDA of the display panel 110. The gate driving circuit 130 may be implemented in the COF type.

The display device 100 may include at least one source printed circuit board SPCB and a control printed circuit board CPCB on which control components and various electronic devices are mounted for circuitry connection between one or more source driver integrated circuit SDIC and other devices.

A circuit film SF on which the source driver integrated circuit SDIC is mounted may be connected to the at least one source printed circuit board SPCB. In other words, the circuit film SF on which the source driving integrated circuit SDIC is mounted may have one side electrically connected to the display panel 110 and the other side electrically connected to the source printed circuit board SPCB.

The controller 140, a power management IC 310, and the like may be mounted on the control printed circuit board CPCB. The controller 140 may perform overall control functions related to driving the display panel 110 and control the operations of the data driving circuit 120 and the gate driving circuit 130. The power management IC 310 may supply various voltages or currents to the data driving circuit 120 and the gate driving circuit 130 or control various voltages or currents to be supplied to the data driving circuit 120, the gate driving circuit 130, etc.

The at least one source printed circuit board SPCB and the control printed circuit board CPCB may be circuitally connected through at least one connection cable CBL. Here, the connection cable CBL may be, for example, a flexible printed circuit, a flexible flat cable, etc.

In an embodiment, the connection cable CBL may be connected to each of the source printed circuit board SPCB and the control printed circuit board CPCB in a connector connection manner. The connection cable CBL may be connected to a connector formed on the source printed circuit board SPCB through a first connector at one side thereof and connected to a connector formed on the control printed circuit board CPCB through a second connector at the other side thereof.

Connection failure of the connector may occur in at least one of the plurality of connection cables CBL. For example, when the connector is tilted, a portion of a connector pin is not connected. When such connection failure of the connector occurs, the voltage or current generated from the power management IC 310 may not be correctly transmitted to the source printed circuit board SPCB. Therefore, the function of detecting the connection failure of the connector may be performed by the controller 140. This will be described in more detail below.

The at least one source printed circuit board SPCB and the control printed circuit board CPCB may be implemented integrally as one printed circuit board.

Figure 5:
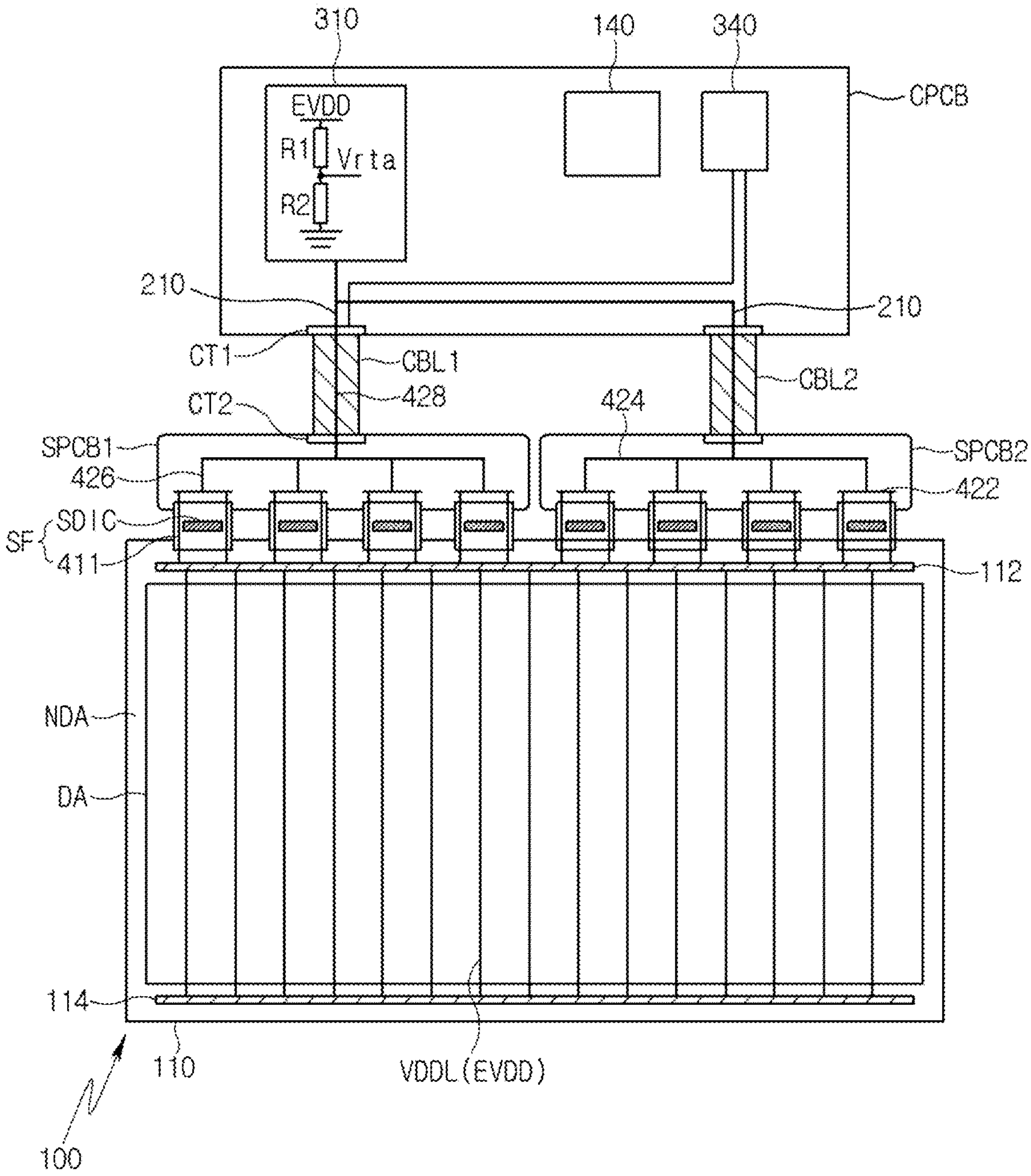
FIG. 5 is a view for describing a configuration of a voltage line of the display device according to an embodiment.
Figure 6:
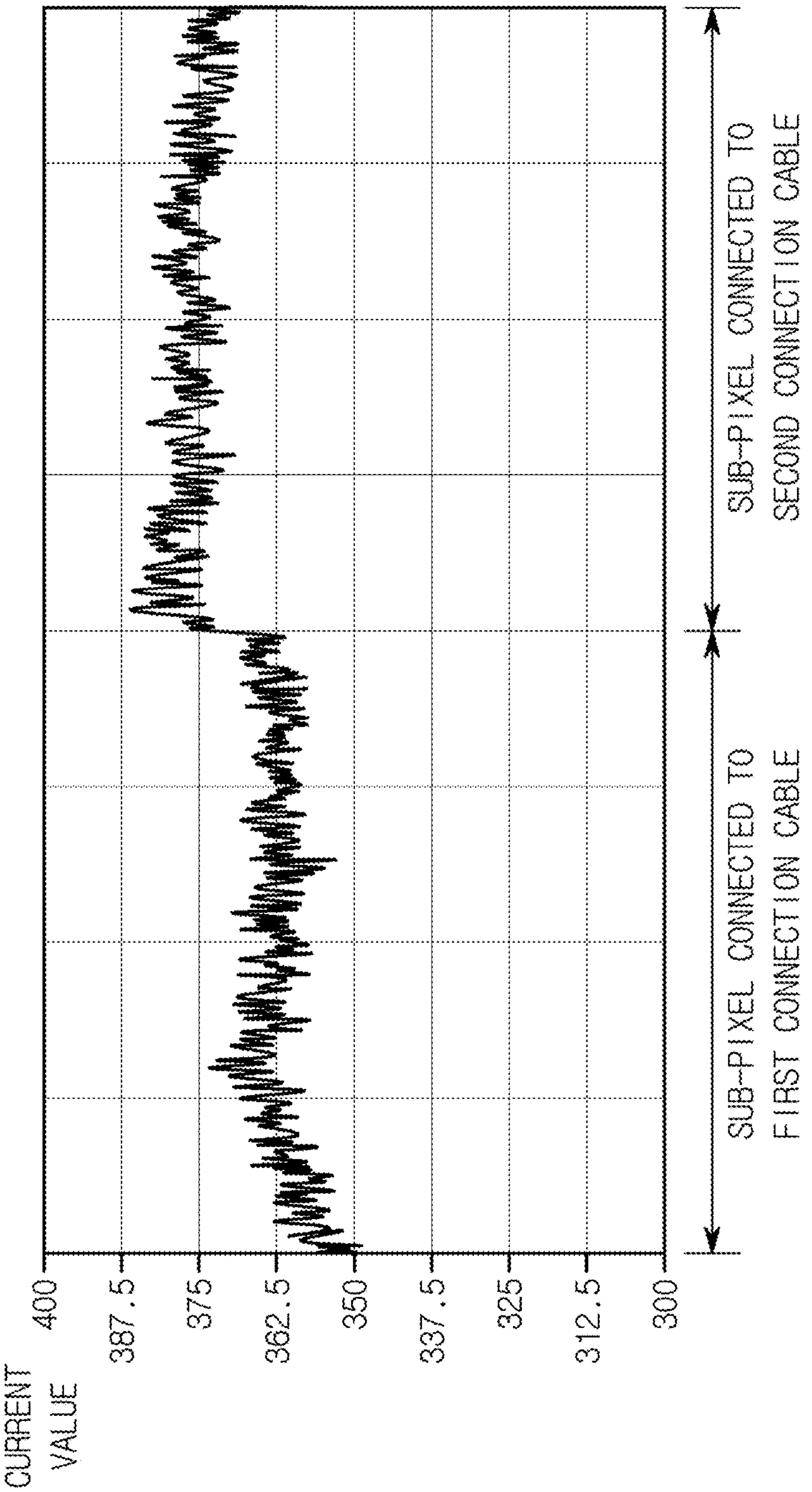
FIG. 6 is a view showing a current sensing result according to an embodiment.

FIG. 5 is a view for describing a configuration of a voltage line of the display device according to an embodiment. FIG. 6 is a view showing a current sensing result according to an embodiment.

Referring to FIG. 5 the display panel 110 may include the display area DA in which images are displayed and the non-display area NDA near the display area DA. The display panel 110 includes a plurality of data lines (not shown), e.g., intersecting each other, sub-pixels (not shown) connected to a plurality of gate lines (not shown), a plurality of voltage lines VDDL parallel to the plurality of data lines, and common voltage lines 112 and 114 commonly connected to upper and lower sides of each of the plurality of voltage lines VDDL.

Each of the plurality of voltage lines VDDL may be formed between the plurality of data lines to be parallel to the plurality of data lines or formed to be shared between two sub-pixels adjacent to each other in a left-right direction.

The first common voltage line 112 is formed in the non-display area NDA at the upper side of the display panel 110 and commonly connected to the upper side of each of the plurality of voltage lines VDDL. A driving voltage EVDD is supplied from the power management IC 310 to the first common voltage line 112. The second common voltage line 114 is formed in the non-display area NDA at the lower side of the display panel 110 and commonly connected to the lower side of each of the plurality of voltage lines VDDL.

Circuit films SF on which the source driver integrated circuit SDIC is mounted are connected to one side of the display panel 110. Each of the circuit films SF includes at least one first voltage supply line 411. The first voltage supply line 411 is connected to the first common voltage line 112 to supply the driving voltage supplied from the power management IC 310 to the first common voltage line 112.

The circuit films SF are connected to source printed circuit boards SPCB1 and SPCB2. Some of the circuit films SF are connected to the first source printed circuit board SPCB1, and the others are connected to the second source printed circuit board SPCB2. In FIG. 5, an example of the two source printed circuit boards SPCB1 and SPCB2 is shown, but the number of source printed circuit boards SPCB1 and SPCB2 is not limited thereto.

Each of the source printed circuit boards SPCB1 and SPCB2 is formed so that various lines, such as a plurality of second voltage supply lines 422, a third voltage supply line 424, and a plurality of fourth voltage supply lines 426, are separated.

Each of the plurality of second voltage supply lines 422 is formed on the source printed circuit boards SPCB1 and SPCB2 to be adjacent to the circuit films SF1 and SF2 and connected to the first voltage supply lines 411 formed on the circuit films SF1 and SF2. The third voltage supply line 424 is formed on the source printed circuit boards SPCB1 and SPCB2 to have a relatively greater area than each of the plurality of second voltage supply lines 422. The driving voltage is supplied from the power management IC 310 to the third voltage supply line 424 through second connectors CT2 formed on the source printed circuit boards SPCB1 and SPCB2. Each of the plurality of fourth voltage supply lines 426 is branched from the third voltage supply line 424 at regular intervals and connected to the corresponding second voltage supply line 422.

The control printed circuit board CPCB is connected to the source printed circuit boards SPCB1 and SPCB2 through connection cables CBL1 and CBL2. In this case, each of the connection cables CBL1 and CBL2 is connected to any one of the corresponding source printed circuit board SPCB1 and SPCB through the second connector CT2 and connected to the control printed circuit board CPCB through a first connector CT1 to transmit signals between the control printed circuit board CPCB and the source printed circuit board SPCB.

At least one fifth voltage supply line 428 for supplying the driving voltage supplied to the first connector CT1 to the second connector CT2 is formed on each of the connection cables CBL1 and CBL2. The fifth voltage supply line 428 is connected to the power management IC 310 through the first connector CT1 and the sixth voltage supply line 210 of the control printed circuit board CPCB.

The power management IC 310 formed on the control printed circuit board CPCB generates the driving voltage using externally supplied input power and supplies the driving voltage, such as a high potential driving voltage EVDD, to the display panel 110 through the voltage supply lines 210, 428, 424, 426, 422, and 411 and the voltage lines VDDL.

In an embodiment, the display device 100 may further include a sensing unit 340. The sensing unit 340 may be mounted on the control printed circuit board CPCB and connected to the sensing lines RVL of the sub-pixels SP. During the sensing process, the sensing unit 340 senses the characteristic values of the sub-pixels SP, for example, the current values flowing through the sensing lines RVL, converts the sensed current value into digital sensing data, and provides the digital sensing data to the controller 140.

During the sensing process, the controller 140 may transmit predetermined image data Data (e.g., test image data) to the sub-pixels SP through the data driving circuit 120, and the sensing unit 340 may convert the current value sensed from the sub-pixel SP into the sensing data and provide the sensing data to the controller 140.

The characteristic value of the sub-pixel SP measured through the sensing line RVL during the sensing process may be determined according to the value of the high potential driving voltage EVDD applied to the sub-pixel SP. When the driving current applied to the light emitting element OLED in the sub-pixel SP connected to the predetermined voltage line VDDL decreases or increases rapidly due to the connection failure of the connector, the current value may be reflected in the sensing data.

The controller 140 may determine whether the high potential driving voltage (overcurrent) has occurred by comparing the sensing data with a preset first reference value and when it is determined that the overcurrent will occur, output a failure detection signal BDP to the host system 150, etc.

In an embodiment, when the connection failure of any one of the connectors CT1 and CT2 of the connection cables CBL1 and CBL2 occurs between the control printed circuit board CPCB and the source printed circuit boards SPCB1 and SPCB2, the high potential driving voltage EVDD may be applied to the display panel 110 through the other of the connection cables CBL1 and CBL2.

The high potential driving voltage EVDD applied to some voltage lines VDDL through one-side connection cables CBL1 and CBL2 may be transmitted to other voltage lines VDDL through the second common voltage line 114. Therefore, despite the connection failure of the connectors CT1 and CT2, the high potential driving voltage EVDD may be transmitted to the voltage lines VDDL formed on the display panel 110.

However, in the display device 100 using the high-level high potential driving voltage EVDD, heat may be generated from the second common voltage line 114 transmitting the high potential driving voltage EVDD, thereby degrading the display panel 110. To prevent such a problem, the display device 100 may be configured to detect the connection failure of the connection cables CBL1 and CBL2 by comparing current values sensed from the sub-pixels connected to the fifth voltage supply line 428 through the first connection cable CBL1 with current values sensed from the sub-pixels connected to the fifth voltage supply line 428 through the second connection cable CBL2.

For example, during the sensing process, the controller 140 may transmit predetermined image data Data (e.g., test image data) to the sub-pixels SP through the data driving circuit 120, and the sensing unit 340 may convert the current value sensed from the sub-pixel SP into the sensing data and provide the sensing data to the controller 140.

The controller 140 may determine whether the overcurrent occurs by comparing the sensing data with the preset first reference value and when it is determined that overcurrent will occur, further sense whether the connection failure of the connector occurs. To this end, the sensing unit 340 may generate the current value input through the first connection cable CBL1 and the current value input through the connection cable CBL2 as sensing data and transmit the sensing data to the controller 140.

When the voltage is not transmitted through the connection cables CBL1 and CBL2 due to the connection failure, the sensing data, that is, the current values acquired from the sub-pixels SP connected to the connection cable CBL1 and from the sub-pixels connected to the connection cable CBL2 are different as shown in FIG. 6. Therefore, the controller 140 may compare the current value input through the first connection cable CBL1 and the current value input through the second connection cable CBL2 and when a difference between the current values is greater than a preset second reference value, determine that the connection failure of the connector has occurred and output the failure defection signal BDP to the host system 150, etc.

As described above, since the display device 100 uses the high-level high potential driving voltage EVDD and the high potential driving voltage EVDD is supplied to all voltage lines VDDL through the second common voltage line 114 formed on the display panel 110, a difference between the current values may not be detected based on the high potential driving voltage EVDD. In addition, during the sensing process, a degradation problem of the display panel 110 may occur.

To prevent the same, the display device 100 according to an embodiment may be configured to sense the current value using a sensing voltage Vrta. For example, the power management IC 310 is configured to generate the sensing voltage Vrta for current sensing. For example, the sensing voltage Vrta may be a voltage obtained by dividing the high potential driving voltage EVDD using predetermined resistance components R1 and R2, as shown, but is not limited thereto. In an embodiment, the high potential driving voltage EVDD may be about 20 V, and the sensing voltage Vrta generated by dividing the high potential driving voltage EVDD may be about 4.5 V, but the present disclosure is not limited thereto.

During the sensing process, the power management IC 310 is controlled to apply the sensing voltage Vrta to the display panel 110 through the fifth voltage supply line 428. The controller 140 may compare the current value sensed through the fifth voltage supply line 428 connected to the first connection cable CBL1 with the current value sensed through the fifth voltage supply line 428 connected to the second connection cable CBL2 through the sensing unit 340 in response to the sensing voltage Vrta. The current value sensed through the sixth voltage supply line 210 connected to the first connection cable CBL1 reflects current of the sub-pixels connected to the first connection cable CBL1. The current value sensed through the sixth voltage supply line 210 connected to the second connection cable CBL2 reflects current of the sub-pixels connected to the second connection cable CBL2. When a difference between the current values is greater than the preset second reference value, the controller 140 may determine that the connection failure of the connector has occurred and output the failure detection signal BDP to the host system 150, etc.

Figure 7:
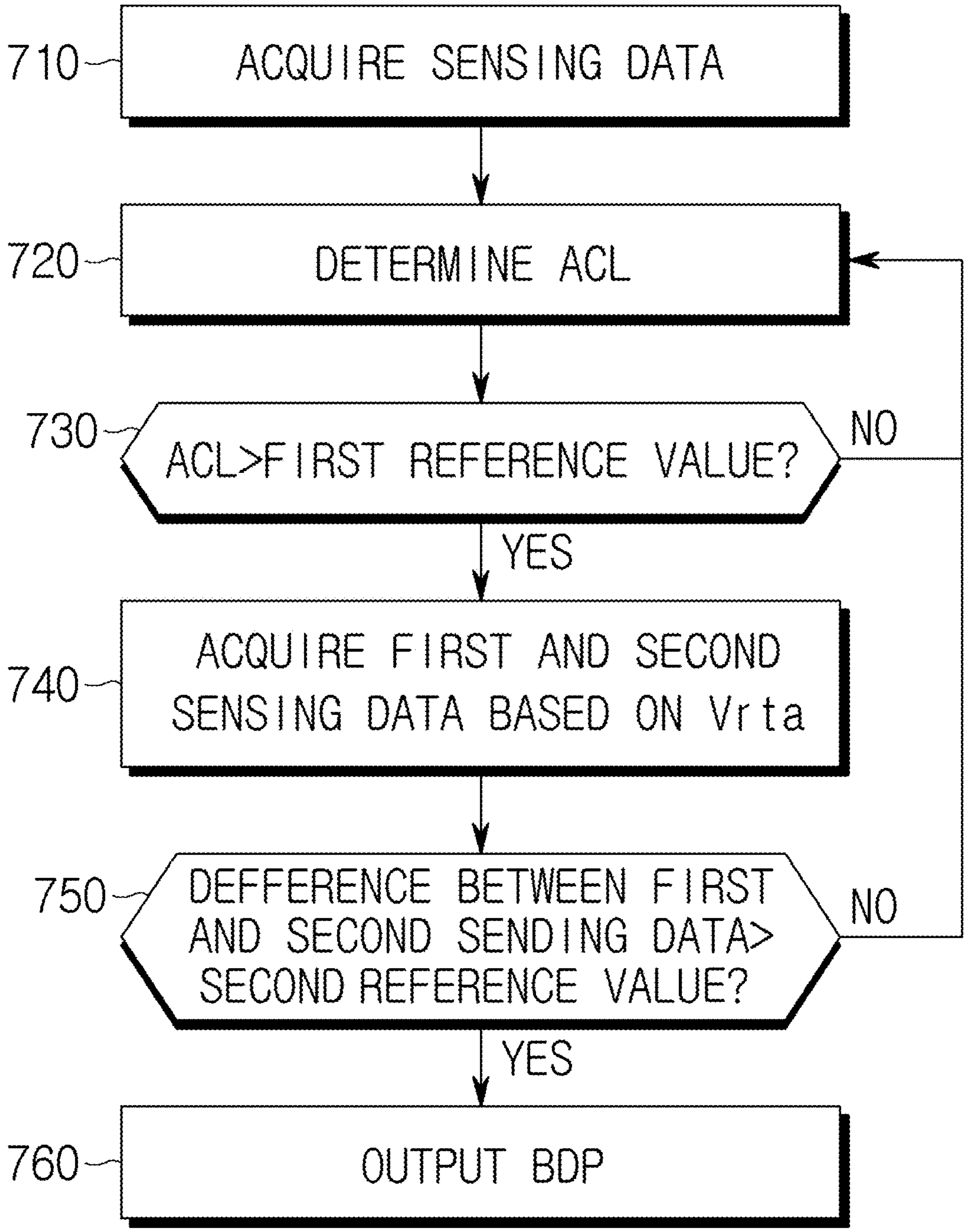
FIG. 7 is a flowchart showing a method of detecting failure of the display device according to an embodiment.

FIG. 7 is a flowchart showing a method of detecting failure of the display device according to an embodiment.

Referring to FIG. 7, when the current value is acquired as the sensing data through the sensing process (710), the controller 140 may determine an average current luminance (ACL) based on the sensing data (720). When the average current luminance is increase, the sensed current value is increase, and when the average current luminance is decrease, the sensed current value is decrease. The average current luminance can be determined from the sensing data through a lookup table that defines the relationship between the current value and the average current luminance. The controller 140 may compare the determined average current luminance with the preset first reference value (730) and when the average current luminance is greater than the first reference value, determine that the connection failure of the connector has occurred. For example, the controller is configured to controls the power management integrated circuit 310 to output the driving voltage, sense subpixels to obtain sensing data, and determines an average current luminance based on the sensing data of the subpixels acquired in response to the driving voltage.

For example, the controller 140 may control the power management IC 310 to apply the sensing voltage Vrta to the display panel 110, acquire first sensing data from the subpixels SP connected to the first connection cable CBL1, and acquire second sensing data from the sub-pixels SP connected to the second connection cable CBL2 (740). In addition, the controller 140 may determine whether a difference between the first and second sensing data is greater than the preset second reference value by comparing the acquired first and second sensing data (750).

When the difference between the first and second sensing data is greater than the preset second reference value, the controller 140 may determine that the connection failure of the connector has occurred and output the failure detection signal BDP to the host system 150, etc. (760).

Figure 8:
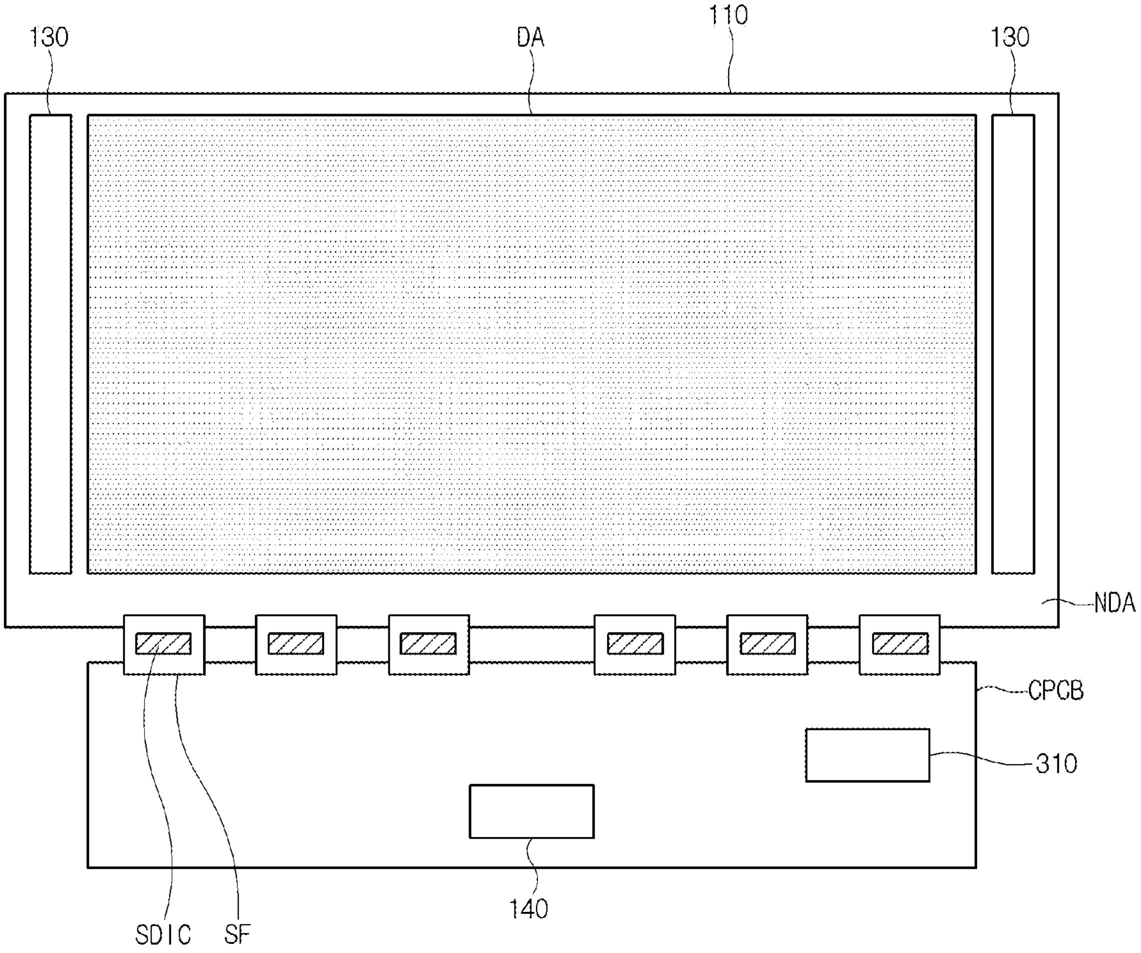
FIG. 8 is a view showing a display device according to another embodiment.

FIG. 8 is a view showing a display device according to another embodiment.

Referring to FIG. 8, the display panel 110 may include the display area DA in which images are displayed and the non-display area NDA in which the images are not displayed.

When the data driving circuit 120 includes one or more source driver integrated circuits SDIC and is implemented in the COF type, each source driver integrated circuit SDIC may be mounted on the circuit film SF connected to the non-display area NDA of the display panel 110.

The gate driving circuit 130 may be implemented in the GIP type. In this case, the gate driving circuit 130 may be formed in the non-display area NDA of the display panel 110. The gate driving circuit 130 may be implemented in the COF type.

Compared to an embodiment of FIG. 4, in an embodiment of FIG. 8, the display panel 110 is directly connected to the control printed circuit board CPCB through the circuit film SF on which the source driver integrated circuit SDIC is mounted. In the present embodiment, the circuit film SF may be connected to the display panel 110 and the control printed circuit board CPCB through a connector, such as the connection cable CBL. In addition, the controller 140 may determine the connection failure of the connector of the circuit film SF using the above-described method of sensing connection failure. In other words, in an embodiment described with reference to FIG. 5, like sensing the connection failure of the first connection cable CBL1 and the second connection cable CBL2, the controller 140 may determine the connection failure of at least one connector among the circuit films SF (e.g., the first circuit film and the second circuit film).

Through such a structure, the display device 100 can reduce risk of the connection failure of the connector by integrating the control printed circuit board CPCB and the source printed circuit board SPCB into one component. In addition, through such a structure, the display device 100 can reduce electro-magnetic interference EMI due to an increase in epitaxy EPI lines by unifying the EPI lines connecting the controller 140 with the components.

The controller 140, the power management IC 310, and the like may be mounted on the control printed circuit board CPCB. The controller 140 may perform overall control functions related to driving the display panel 110 and control the operations of the data driving circuit 120 and the gate driving circuit 130. The power management IC 310 may supply various voltages or currents to the data driving circuit 120 and the gate driving circuit 130 or control various voltages or currents to be supplied to the data driving circuit 120, the gate driving circuit 130, etc.

Figure 9:
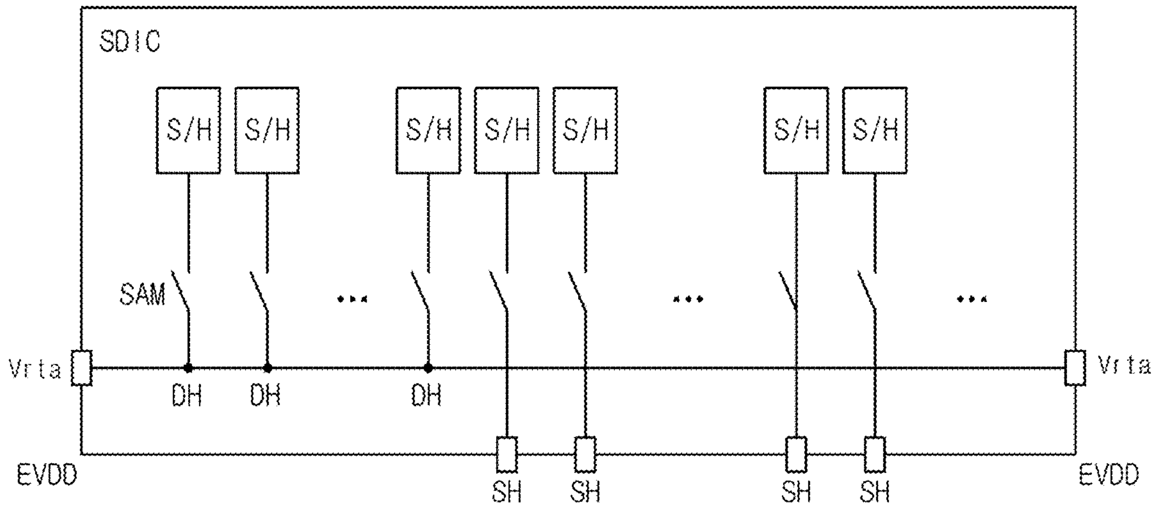
FIG. 9 is an enlarged view of a source driver integrated circuit of FIG. 8.

FIG. 9 is an enlarged view of a source driver integrated circuit of FIG. 8. For example, FIG. 9 shows the arrangement structure of a sensing channel SH and a dummy channel DH of the source driver integrated circuit SDIC.

Referring to FIG. 9, the source driver integrated circuit SDIC according to an embodiment may include a plurality of sensing channels SH and one or more dummy channels DH.

The plurality of sensing channels SH receive the high potential driving voltage EVDD from the power management IC 310.

The one or more dummy channels DH may be formed at one sides or both sides of the plurality of sensing channels SH as shown. In other words, the one or more dummy channels DH may be formed on edge areas at one sides or both sides of the source driver integrated circuit SDIC. However, the present embodiment is not limited thereto. In other words, in other embodiments, the one or more dummy channels DH may be disposed between the sensing channels SH.

The one or more dummy channels DH receive the sensing voltage Vrta. The sensing voltage Vrta may be generated independently from the high potential driving voltage EVDD or generated by dividing the high potential driving voltage EVDD and may be lower than the high potential driving voltage EVDD.

The sensing channel SH and the dummy channel DH may each be connected to the sensing line RVL of the sub-pixel SP through the corresponding sampling switch SAM. In an embodiment, during the sensing process, the high potential driving voltage EVDD may be applied to the sub-pixels SP through the plurality of sensing channels SH, and the characteristic values of the sub-pixels SP may be sensed in response to the applied high potential driving voltage EVDD. In addition, during the sensing process, the sensing voltage Vrta may be applied to the sub-pixels SP through the at least one dummy channel DH, and the characteristic values of the sub-pixels SP may be sensed in response to the sensing voltage Vrta.

Through such a structure, the sensing voltage Vrta and the high potential driving voltage EVDD may be alternately applied to accurately determine whether the overcurrent has occurred on the display panel 110 and whether the connection failure of the connector has occurred at any time.

In the display device according to an embodiments, when the high current driving voltage is used, it is possible to detect the degradation and concentration phenomena of the display panel due to the connection failure of the connector.

In the display device according to an embodiments, by quickly detecting the connection failure of the connector in real time, it is possible to prevent the problems of degradation, heating, and the like of the display panel.

Although an embodiments of the present disclosure have been described above with reference to the accompanying drawings, those skilled in the art to which the present disclosure pertains will be able to understand that the above-described technical configuration of the present disclosure can be carried out in other specific forms without changing the technical spirit or essential features thereof. Therefore, it should be understood that the above-described embodiments are illustrative and not restrictive in all respects. In addition, the scope of the present disclosure is described by the claims to be described below rather than the detailed description. In addition, the meaning and scope of the claims and all changed or modified forms derived from the equivalent concept should be construed as being included in the scope of the present disclosure.

The various embodiments described above can be combined to provide further embodiments. Aspects of an embodiments can be modified, if necessary to employ concepts of the various embodiments to provide yet further embodiments.

These and other changes can be made to an embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:

a control printed circuit board on which a power management integrated circuit configured to generate and output a driving voltage is mounted;

first and second connection cables connected to the control printed circuit board each through a respective first connector;

first and second source printed circuit boards connected to the first and second connection cables, respectively, each through a respective second connector;

circuit films each connected to one of the first or the second source printed circuit boards, and each including a source driver integrated circuit; and a display panel which is connected to the circuit films, the display panel including sub-pixels configured to receive the driving voltage output from the power management integrated circuit through one of the first or second connection cable, wherein the control printed circuit board further includes:

a sensing circuitry configured to sense a first current value flowing through the sub-pixels via the first connection cable and a second current value flowing through the sub-pixels via the second connection cable, convert the sensed first and second current values into the first and second sensing data, respectively, and transmit the first and second sensing data to a controller; and the controller configured to acquire the first sensing data and the second sensing data from the sensing circuitry, and determine connection failure involving one or more of the first connection cable or the second connection cable based on a difference between the first sensing data and the second sensing data.

2. The display device of claim 1, wherein the controller is configured to output a failure detection signal when the difference between the first sensing data and the second sensing data is greater than a threshold value.

3. The display device of claim 1, wherein the controller is configured to determine an average current luminance based on sensing data sensed from the sub-pixels and in response to the average current luminance is greater than a threshold value, further determine the connection failure involving one or more of the first connection cable or the second connection cable.

4. The display device of claim 1, wherein the power management integrated circuit is configured to output the driving voltage and a sensing voltage, and the controller is configured to control the power management integrated circuit to output the sensing voltage and to determine the connection failure based on the first and second sensing data acquired in response to the sensing voltage.

5. The display device of claim 4, wherein the controller is configured to control the power management integrated circuit to output the driving voltage, determine an average current luminance based on sensing data acquired in response to the driving voltage, control the power management integrated circuit to output the sensing voltage in response to the average current luminance is greater than a first reference value, and determine the connection failure based on the first and second sensing data acquired in response to the sensing voltage.

6. The display device of claim 4, wherein the sensing voltage is a voltage obtained by dividing the driving voltage using a resistance voltage dividing component.

7. The display device of claim 1, wherein each of the sub-pixels includes:

a light emitting element;

a driving transistor connected to the driving voltage and the light emitting element to control the magnitude of a driving current flowing to the light emitting element according to a voltage applied to a gate node;

a first transistor turned on by a gate signal to apply a data voltage applied to a data line to the gate node of the driving transistor; and a second transistor turned on by a sensing signal to output a current reflecting a characteristic value of the sub-pixel to a sensing line, and the sensing circuitry sensing a current value output to the sensing line.

8. The display device of claim 7, wherein the source driver integrated circuit includes:

a plurality of sensing channels configured to receive the driving voltage from the power management integrated circuit and connected to the sensing line through a switching element; and one or more dummy channels configured to receive the sensing voltage from the power management integrated circuit and connected to the sensing line through the switching element.

9. The display device of claim 8, wherein the one or more dummy channels are disposed on edge areas at one or more sides of the source driver integrated circuit.

10. A display device, comprising:

a control printed circuit board on which a power management integrated circuit configured to generate and output a driving voltage is mounted;

first and second circuit films each connected to the control printed circuit board through a respective first connector; and a display panel connected to the first circuit film and the second circuit film each through a respective second connector, the display panel including sub-pixels configured to receive the driving voltage from the power management integrated circuit, wherein the control printed circuit board further includes:

a sensing circuitry configured to sense a first current value flowing through the sub-pixels via the first connection cable and a second current value flowing through the sub-pixels via the second connection cable, convert the sensed first and second current values into the first and second sensing data, respectively, and transmit the first and second sensing data to a controller; and the controller configured to acquire the first sensing data from and the second sensing data from the sensing circuitry, and determine connection failure involving one or more of the first circuit film or the second circuit film based on a difference between the first sensing data and the second sensing data.

11. The display device of claim 10, wherein the controller is configured to output a failure detection signal in response to the difference between the first sensing data and the second sensing data is greater than a threshold value.

12. The display device of claim 10, wherein the controller is configured to determine an average current luminance based on sensing data sensed from the sub-pixels and in response to the average current luminance is greater than a threshold value, further determine the connection failure involving one or more of the first circuit film and the second circuit film.

13. The display device of claim 10, wherein the power management integrated circuit is configured to output the driving voltage and a sensing voltage, and the controller is configured to control the power management integrated circuit to output the sensing voltage and determine the connection failure based on the first and second sensing data acquired in response to the sensing voltage.

14. The display device of claim 13, wherein the controller is configured to control the power management integrated circuit to output the driving voltage, determines an average current luminance based on sensing data acquired in response to the driving voltage, control the power management integrated circuit to output the sensing voltage in response to the average current luminance is greater than a threshold value, and determines the connection failure based on the first and second sensing data acquired in response to the sensing voltage.

15. The display device of claim 13, wherein the sensing voltage is a voltage obtained by dividing the driving voltage using a resistance voltage dividing component.

16. A method of driving a display device including a control printed circuit board on which a controller and a power management integrated circuit configured to generate and output a driving voltage are mounted, first and second connection cables connected to the control printed circuit board each through a respective first connector, first and second source printed circuit boards connected to the first and second connection cables, respectively, each through a respective second connector, circuit films on which the source driver integrated circuit is mounted and which is connected to the first and second source printed circuit boards, and a display panel which is connected to the circuit films and on which sub-pixels receiving the driving voltage from the power management integrated circuit through the first or second connection cable are disposed, the method comprising:

by a sensing circuitry, sensing a first current value flowing through the sub-pixels via the first connection cable and a second current value flowing through the sub-pixels via the second connection cable;

converting the sensed first and second current values into first and second sensing data, respectively; and transmitting the first and second sensing data to the controller;

by the controller, acquiring the first sensing data and acquiring the second sensing data from the sensing circuitry;

determining whether a difference between the first sensing data and the second sensing data is greater than a first threshold value; and outputting a failure detection signal when the difference between the first sensing data and the second sensing data is greater than the first threshold value.

17. The method of claim 16, wherein the acquiring of the first sensing data and the second sensing data includes:

applying a driving voltage to the sub-pixels;

acquiring sensing data from the sub-pixels;

determining an average current luminance based on the sensing data; and determining whether the average current luminance is greater than a second threshold value, and in response the average current luminance is greater than the second threshold value, acquiring the first sensing data and the second sensing data by applying a sensing voltage to the sub-pixels.

18. The method of claim 17, wherein the power management integrated circuit is configured to output the driving voltage and the sensing voltage, the acquiring of the sensing data from the sub-pixels includes controlling the power management integrated circuit to output the driving voltage, and the acquiring of the first sensing data and the second sensing data includes controlling the power management integrated circuit to output the sensing voltage.

19. The method of claim 18, wherein the sensing voltage is a voltage obtained by dividing the driving voltage using a resistance voltage dividing component.

20. A display device, comprising:

a control printed circuit board including a controller, a sensing circuitry and a power management integrated circuit configured to generate and output a driving voltage;

a display panel including a first sub-pixel and a second sub-pixel;

a first connection path including a first connector connected between the first sub-pixel and the power management integrated circuit; and a second connection path including a second connector connected between the second sub-pixel and the power management integrated circuit, wherein the sensing circuitry is configured to sense a first current value flowing through the first sub-pixel via the first connection path and a second current value flowing through the second sub-pixel via the second connection path, convert the sensed first and second current values into first and second sensing data, respectively, and transmit the first and second sensing data to the controller, and wherein the controller is configured to acquire the first sensing data and the second sensing data from the sensing circuitry, and determine connection failure involving one or more of the first connector or the second connector based on a difference between the first sensing data and the second sensing data.

* * * * *